United States Patent [19]

Fanning et al.

[11] 4,240,127
[45] Dec. 16, 1980

[54] METALLIZED FILM CAPACITOR AND METHOD OF MANUFACTURE

[75] Inventors: William J. Fanning, Glen Ellyn; Otto T. Masopust, Jr., Cicero, both of Ill.

[73] Assignee: Western Electric Company, Inc., New York, N.Y.

[21] Appl. No.: 974,182

[22] Filed: Dec. 28, 1978

[51] Int. Cl.³ .......................................... H01G 1/015
[52] U.S. Cl. .................... 361/304; 29/25.42; 219/121 LJ; 361/308; 361/309; 361/323
[58] Field of Search ............... 301/303, 304, 308, 309; 219/121 LM, 121 LJ; 29/25.42; 361/323

[56] References Cited

U.S. PATENT DOCUMENTS

| | | |
|---|---|---|
| 2,683,792 | 7/1954 | Dublier . |
| 2,716,180 | 8/1955 | Dublier . |
| 2,727,297 | 12/1955 | Fralish ................................. 361/304 |
| 3,486,221 | 12/1969 | Robinson . |
| 3,597,579 | 8/1971 | Lumley . |
| 3,786,224 | 1/1974 | Heywang . |
| 3,790,744 | 2/1974 | Bowen . |
| 3,939,440 | 2/1976 | Berg . |

OTHER PUBLICATIONS

"2-Lead Dip Ceramic Caps B Aux" in Electronic News, 10/76, p. 48.

*Primary Examiner*—E. A. Goldberg
*Attorney, Agent, or Firm*—R. P. Miller

[57] ABSTRACT

A rolled metallized film capacitor is manufactured by completely metallized one surface of each of a pair of dielectric films, and advancing the films while laser scribing patterns of demetallized lines on the respective films which are wound together to provide a pair of capacitor plates of finite areas. As the films are advanced the laser scribing is controlled so that when the films are wound together, the lines on the respective films are in overlaying relationship on the core and peripheral windings, and are diverted to opposed marginal edge portions of the respective films on the intervening windings. When the rolled capacitor films are terminated and connected to a power source the opposed metallized areas on the core and peripheral windings are subjected to equal potentials, whereas the remainder of the windings present two metallized areas between the opposed margin lines which are subjected to potential of opposite polarity to accumulate charges and function as capacitor plates.

28 Claims, 6 Drawing Figures

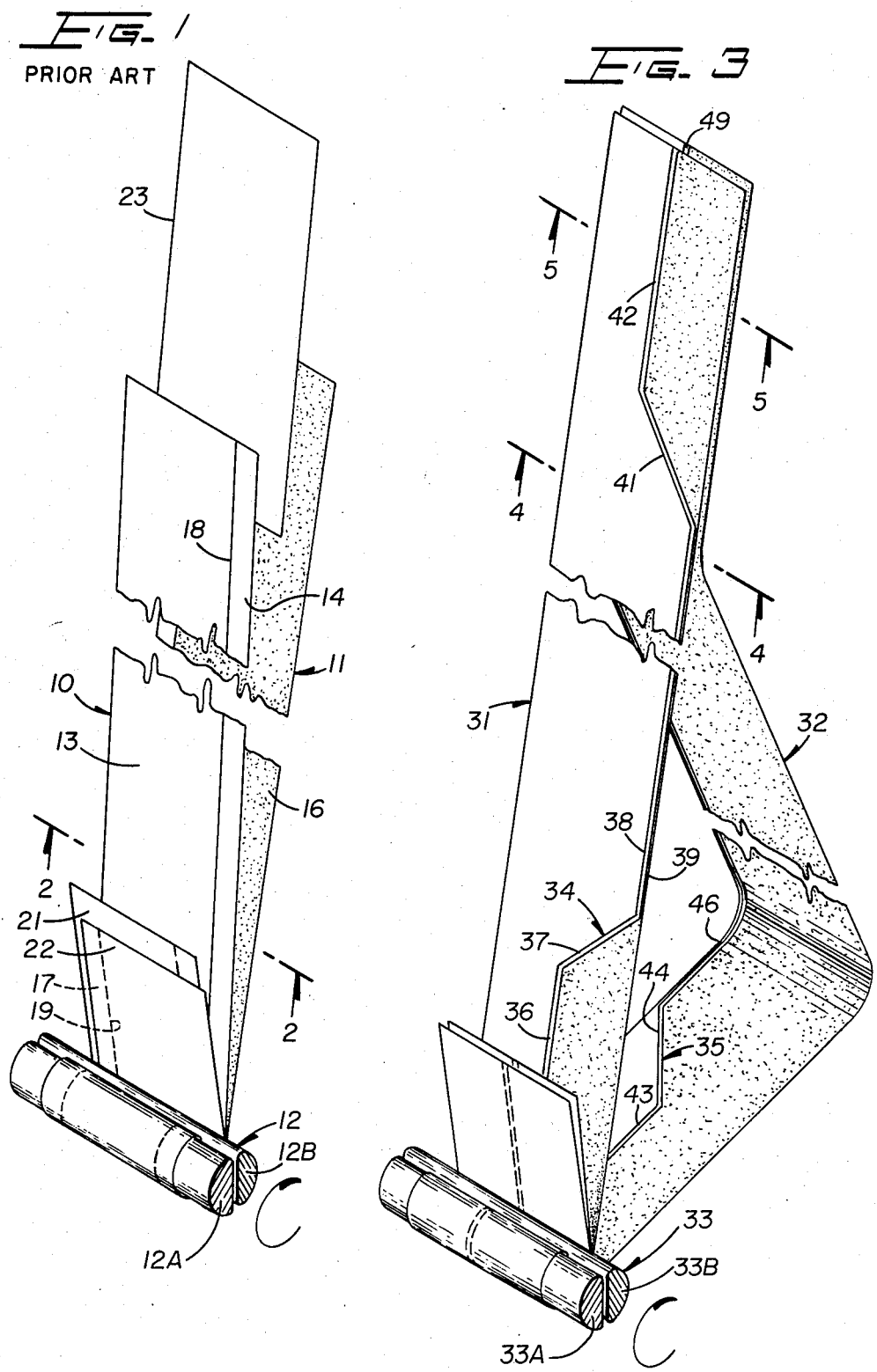

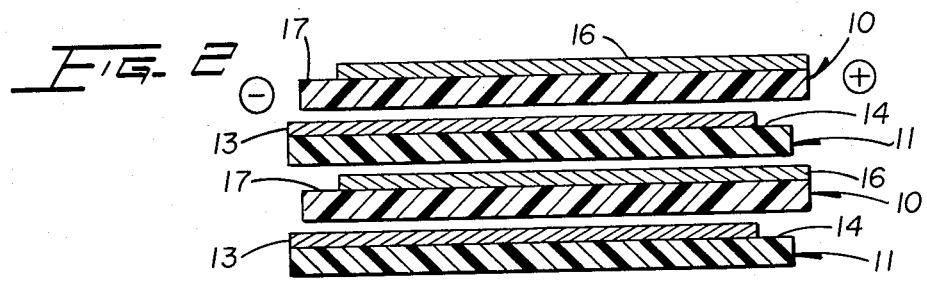
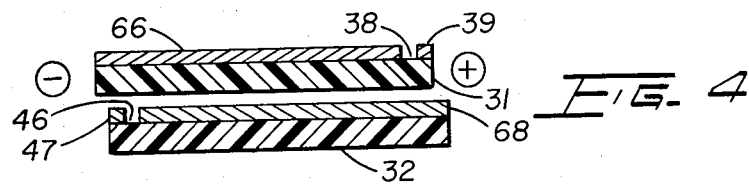
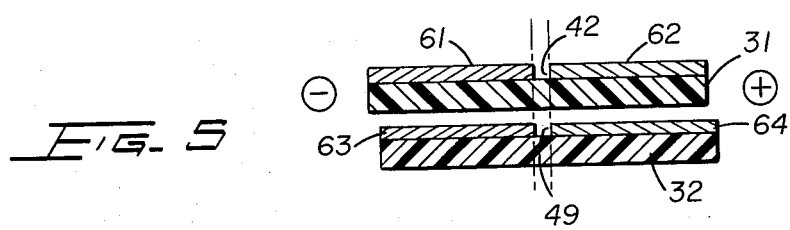
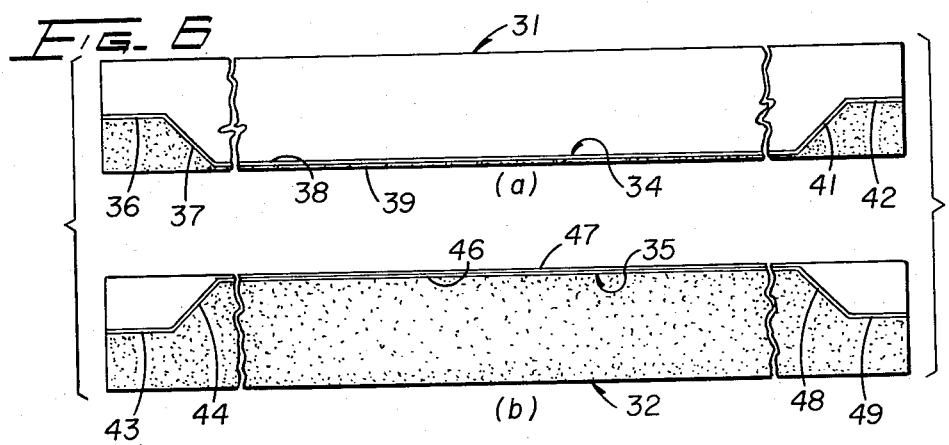
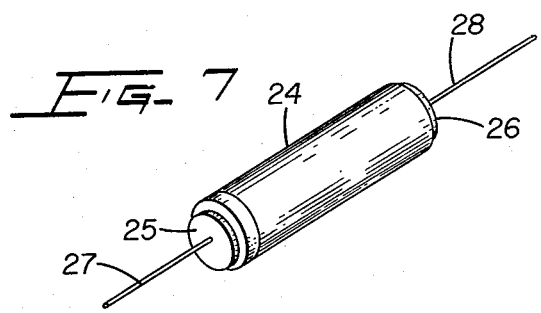

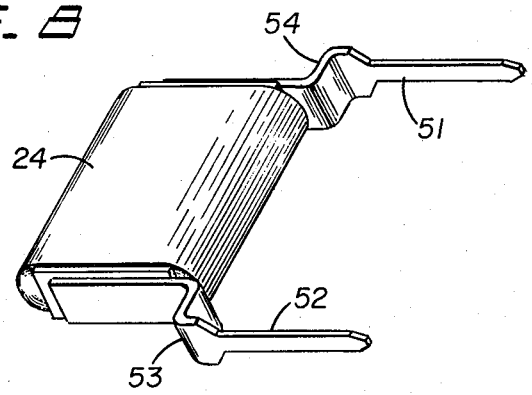
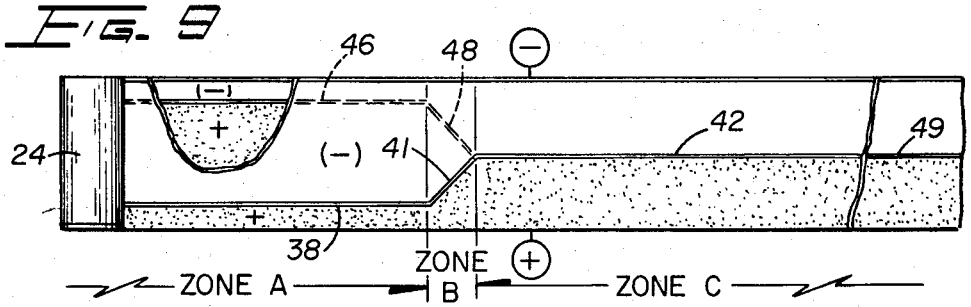
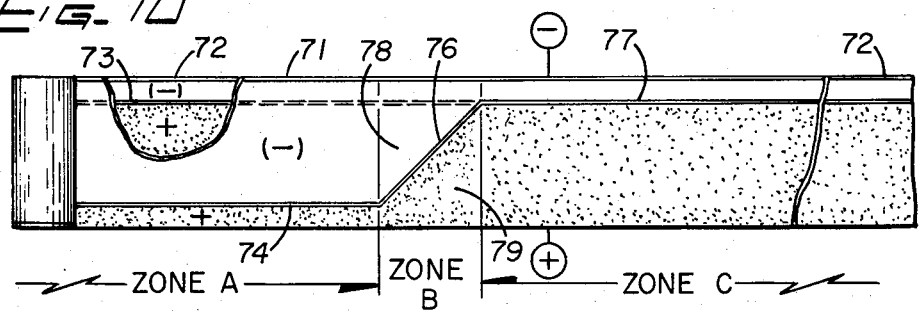
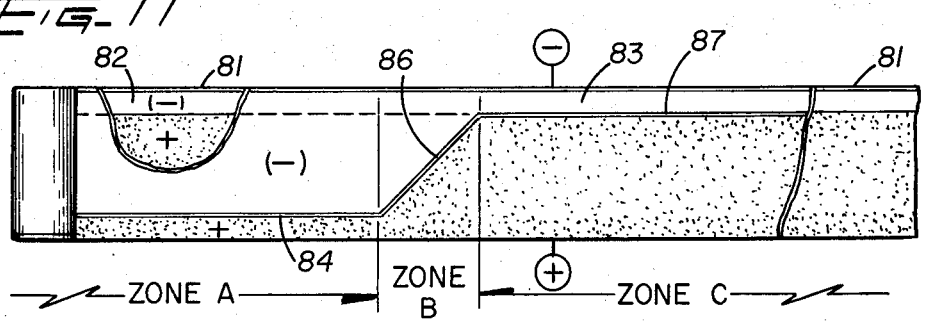

METALLIZED FILM CAPACITOR AND METHOD OF MANUFACTURE

CROSS-REFERENCE TO RELATED APPLICATIONS

W. J. Fanning, Application Ser. No. 974,153, entitled MACHINE FOR LASER SCRIBING AND WINDING METALLIZED FILM CAPACITOR BLANKS, filed on even date herewith and assigned to the Western Electric Company, Incorporated.

J. R. Meal, Application Ser. No. 974,209, entitled PACKAGED MACHINE INSERTABLE ROLLED METALLIZED FILM CAPACITOR, filed on even date herewith and assigned to the Western Electric Company, Incorporated.

TECHNICAL FIELD OF THE INVENTION

This invention relates to laser scribed rolled or wound metallized film capacitors and methods of manufacture thereof, and more particularly to a capacitor constructed of a pair of convoluted metallized films each having a scribe line which at the core and peripheral convolutions are in overlaying relation and are diverged to run longitudinally along opposed margins of the remainder of the respective convolutions to provide a pair of finite capacitor plate areas.

BACKGROUND OF THE INVENTION

Currently rolled metallized film capacitors are usually manufactured by vacuum metallizing one surface of a dielectric film through a mask to provide non-metallized stripes. The metallized film is slit along the non-metallized stripes to provide pairs of film strips having non-metallized, longitudinally extending, opposed margins. A pair of film strips with opposed non-metallized margins are wound in an offset or misregistered relation on an arbor so that the metallized edges of the film strips extend beyond the non-metallized edges. The winding of the film strips is such that the metallized surface of each convolution of one film strip bears against the non-metallized surfaces of the other film strip. Solder is sprayed onto opposed ends to provide porous solder terminations for the subsequent attachment of electrical terminals. Prior to the attachment of the terminals, wax is vacuum impregnated into the wound convolutions to provide a moisture seal to preclude oxidation of the metal on the film strips. The wax may also fill the core hole left by the arbor which is withdrawn following the winding operation. Near the completion of the winding operation a strip of non-coated dielectric material is inserted and wound between the peripheral windings of the metallized film strips so as to prevent short circuiting of the metallized film strips when the outer convolutions including the strip of non-coated dielectric material are heat sealed to prevent unraveling of the rolled film strips.

During the winding operation the film strips are offset from each other to increase the metallized surface areas at the opposed margins which are available to receive the solder terminations. Further, the amount of offset must be sufficient to compensate for variations in the lines of demarcation between the metallized plate areas and the non-metallized margin areas. Inasmuch as the lines of demarcation are set by vapor depositing metal through a mask, there are considerable variations in the linearity of the demarcation lines. As a result, compensating offsets for the variations in the lines of demarcation must be made and there will be a concomitant decrease in the available overlapped metallized areas which determine the capacitance value of the capacitor. The net result of compensating offset is to require the use of wider film strips and thus produce a capacitor of relatively larger physical size.

In the manufacture and design of circuits and circuit boards for use in the telephone and electrical industries there is a continuing need for capacitors having precise capacitance values, small size, stable frequency response characteristics, long life, and good stability under varying temperature and humidity of operating conditions. In general, rolled metallized film capacitors are capable of meeting these needs, however, as circuit design progresses, increased use is being made of integrated circuitry and other semiconductor technology which in turn contemplates the mounting of vast numbers of circuit components on small substrates or printed circuit boards. As this miniaturization progresses there is a continuing requirement to provide compatible, smaller and smaller reliable passive components such as capacitors. One type of capacitor that has been widely used is the small ceramic capacitor. However, ceramic capacitors have a number of inherent deterrents such as temperature sensitivity, inability to self heal, capacitance derogation over a period of time and the characteristic of shorting upon breakdown. Rolled metallized film capacitors do not possess these objectionable deterrents. However, use of rolled film capacitors has been heretofore limited because of their relatively large size, which obviously presents problems in packaging and assembly into miniature circuits.

Considering now the prior art, there is disclosed in U.S. Pat. No. 3,939,440, issued Feb. 17, 1976, to R. D. Berg et al., and assigned to the Western Electric Company, Incorporated, a method of forming a wound resistor-capacitor network wherein a pair of metallized films having non-coated margin areas are simultaneously wound while laser beams scribe lines in the opposed metallized margin areas to define conductive resistor paths on the surfaces of the wound films. In this patent, the non-coated margin is set by depositing metal through a mask, and thus the film must be offset by an amount needed to compensate for linear variations along the demarcation line between the metal coated and non-coated areas. In U.S. Pat. No. 3,597,579, issued Aug. 3, 1971, to R. M. Lumley, and assigned to the Western Electric Company, Incorporated, there is described a method of laser trimming capacitors to value by laser vaporizing sections of capacitor plates or by laser scribing lines on a metallized surface of a capacitor plate to isolate discrete metallized sections from the main metallized plate areas and hence reduce the effective capacitor plate areas.

Another patent showing the use of a laser in the manufacture of rolled film capacitors is U.S. Pat. No. 3,786,224, issued Jan. 15, 1974, to H. Heywang, et al., which utilizes laser beams to remove opposed metallized margins of completely metallized film by directing a laser beam substantially parallel to the metallized surface. In this patent, the rolled film capacitor blank is simultaneously rotated and moved transversely of its axis while the laser beam is vaporizing metal along one margin of one film. This procedure is again practiced to remove the metal along the opposed margin of the other rolled metallized film.

U.S. Pat. No. 2,683,792, issued July 13, 1954, to W. Dublier, and 2,718,180, issued Aug. 23, 1955, to W. Dublier, show electrode discharge means for forming a plurality of finite capacitor plate areas on a metallized film as the film is being advanced to a winding device.

SUMMARY OF THE INVENTION

In accordance with the present invention a capacitor and method of manufacture are contemplated wherein a pair of films, each having one surface completely metallized, are simultaneously wound into a roll as laser beams or other types of beam or discharge energy sources are directed normally to the pair of metallized surfaces. The laser beams scribe lines on the respective films which are in common overlaying position during the winding of the core and peripheral convolutions and which appear along opposed margins of the respective films during the winding of the major portion of the convolutions.

More particularly, as the films are wound, the scribed lines are diverged to run from the overlaying relationship to a spaced apart relationship in the opposed margins of the respective films, and then the scribed lines are converged into overlaying relationship during the winding of the last convolutions. The capacitance value of the capacitor is set predominantly by the size of the overlying metallized areas established by the scribed lines in the opposed margins of the respective films and the scribed lines on the respective films running from the margin lines to the overlaying lines.

After the metallized films have been scribed and wound, the outer convolutions of metallized film are heat sealed to prevent unraveling during the subsequent manufacturing steps. Next, solderable metal is sprayed onto the opposed ends of each roll to form porous solder blocks whereafter wax is vacuum impregnated into the opposite ends of the capacitor rolls and finally electrical leads or terminals are secured to the solder blocks. When electrical potential is applied across these terminals, the capacitor will assume a charge as determined by the size of the overlaying metallized areas set by the scribed lines along the margins and the scribed lines converging into the overlaying lines. It should be noted that the scribed lines on the core and the peripheral windings divide the metallized areas on the respective films into overlaying metallized areas which are ineffective in adding any significant amount of capacitance. Each of these pairs of overlaying pairs of metallized areas have applied thereto potentials of the same polarity and thus are neutral in setting the capacitance value of the capacitor. If the core or peripheral winding metallized areas are shorted while the capacitor is removed from the winding arbor or during the heat sealing operation, the main capacitor plate areas are unaffected.

BRIEF DESCRIPTION OF THE DRAWING

Other features and advantages of the present invention will be apparent upon consideration of the following detailed specification and the drawing, wherein:

FIG. 1 is an isometric view of a pair of metallized films having unmetallized margins which may be wound on a mandrel to provide a rolled metallized film capacitor of conventional construction;

FIG. 2 is an enlarged cross-sectional view taken along line 2—2 of FIG. 1 illustrating the polarity of charges accumulated on the metallized film when the films have been wound and terminated to form a capacitor, FIG. 3 is an isometric view of a pair of metallized film strips which have been scribed along the metallized surfaces in accordance with the principles of the present invention;

FIG. 4 is an enlarged cross-sectional view taken along lines 4—4 of FIG. 3 illustrating the polarity of the charges accumulated on main portions of the metallized film strip when said film strips have been wound and terminated to form a capacitor of the present invention;

FIG. 5 is an enlarged cross-sectional view taken along line 5—5 of FIG. 3 showing the polarity of charges existing on the core and peripheral windings of the metallized film strips when wound and terminated in accordance with the present invention;

FIG. 6a and b is a plan view of the two film strips and the lines scribed thereon which are rolled together to form a capacitor blank;

FIG. 7 is a perspective view of a completed, rolled film capacitor that has been terminated with suitable leads;

FIG. 8 is a perspective view of rolled film capacitor that is flattened and terminated with machine insertable leads;

FIG. 9 is another plan view of the scribed metallized film strips which are partially cut away to illustrate the charges on the metallized surfaces of the capacitor;

FIG. 10 is a plan view of modified scribed metallized film strips, partially cut away, illustrating the charges thereon when the lines are scribed in a different pattern on the peripheral and core windings;

FIG. 11 is a plan view of further modified scribed metallized film strips showing the polarity of the charges on the metallized films when only one metallized film strip is scribed with overlying and margin lines and the other film strip is provided with an unmetallized margin;

DETAILED DESCRIPTION

Figure 12:
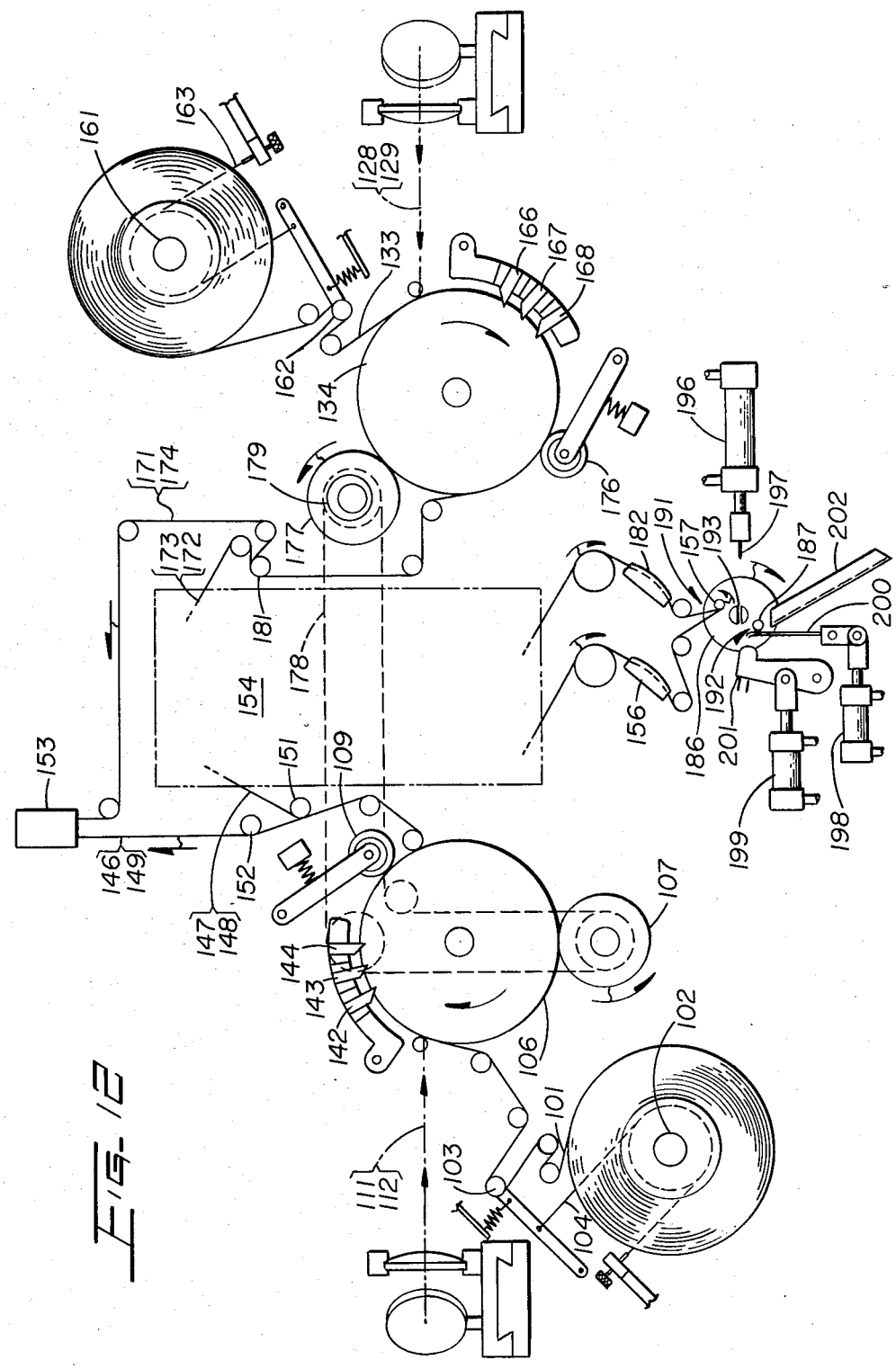
FIG. 12 is a schematic view of a laser scribing and winding system that may be utilized to practice the method of the invention to produce capacitors in accordance with the invention.

In order to better appreciate the significance of applicants' invention and differences thereof over a typical prior art construction of a rolled metallized film capacitor and the method of manufacture thereof, attention is directed first to FIG. 1 for a consideration of one type of rolled metallized film capacitor and the methods presently being employed to manufacture such a capacitor.

A pair of plastic film strips 10 and 11 each metallized on one surface are wound on a split mandrel 12 having half sections 12A and 12B. The metallized film strip 10 has a metallized surface 13 with an unmetallized longitudinally extending margin 14, while the metallized film strip 11 has a metallized surface 16 with an unmetallized longitudinally extending opposed margin 17. In forming the metallized surfaces, metal, such as zinc or aluminum, is vapor deposited or is otherwise coated through a mask onto an advancing thin plastic film constructed of a dielectric material, such as a polycarbonate or a polyester of the type sold under the trademark "Mylar." Inasmuch as the metal vapor is deposited or coated through a mask, the lines of demarcation 18 and 19 between the metallized and unmetallized sections of the film strips are erratic or fuzzy. More particularly, during the masking operation, metal can work its way under the mask and be deposited in the margin area.

The masked metallized film is wound on a take-up arbor core, and then transported to a slitting device where the film is run through the slitter to sever the film along the centers of the metallized and the unmetallized stripes and rewound on another arbor. Next, the rewound film strips are delivered to a winding facility for winding into capacitor blanks. During these various winding and rewinding operations, a certain amount of misregistration or lateral overhang of convolutions is introduced.

The winding of a capacitor blank or roll is accomplished by captivating leading sections 21 and 22 of the pair of film strips between the mandrel halves 12A and 12B, and then rotating the mandrel 12 to wind the leading sections in with the forward sections of the main portions of the film strips. The guiding and positioning of the film strips on the mandrel is such that the strips are wound with an offset or misregistration of one strip with respect to the other so that the completely metallized edges extend beyond the unmetallized edges of the adjacent wound convolutions.

In order to insure that the desired misregistration is attained, a considerable amount of added misregistration must be introduced in forming the unmetallized edge stripes in order to compensate for the fuzzy lines of demarcation and the misregistration introduced by the prior winding and rewinding operations during metallizing and slitting of the films. As a result of this compensation, the metallized strips must be made wider or longer in order to secure the necessary overlap of metallized areas to provide the desired capacitance.

During the winding of a pair of films, the metallized surface of each film abuts the unmetallized surface of the adjacent film strip as the strips are wound together. Near the end of the winding operation, an unmetallized dielectric plastic film strip 23 is inserted between the film strips 10 and 11 and wound therewith to provide several wrappings about the wound metallized film strips. The wound capacitor blank is subjected to an application of peripheral heat to bond and seal the outer wrappings and, thus, preclude unraveling when the mandrel halves are sequentially withdrawn and the capacitor blank is processed in further manufacturing operations.

A wound capacitor blank 24 is sprayed through a mask at each end with a solderable metal to form porous solder blocks 25 and 26 (see FIG. 7) whereafter the capacitor blank is placed in a vacuum chamber and impregnated with wax which deposits in the hole vacated by the withdrawn mandrel and permeates in between the convolutions of film. The deposited wax acts to prevent oxidation of the metal on the film, and also plugs up the vacated mandrel hole. Next, the capacitor blank is terminated by securing wire-like terminals 27 and 28 to the solder blocks 25 and 26.

In an alternative practice, the capacitor blank is flattened prior to the termination steps. In this instance, the terminations may be in the form of radially extending leads, such as depicted in FIG. 8.

Considering now the charging of a capacitor when connected in a charging circuit, reference is made to FIG. 2 which is a cross section of adjacent convoluted film strips which have been wound together. The application of a negative potential to the left edge of the film strip 10 impresses a negative charge on the metallized surface 13, while the application of a positive potential to the right-hand edge of the strip 11 causes the metallized surface 16 to assume a positive charge. From an examination of FIG. 2, it will be noted that the offset relation of the wound film strips provides longitudinal margins of metal which are exposed in the gaps or interstices formed between adjacent convolutions of a strip and the offset interposed convolution of the other strip. These metallized margins exposed within the interstices provide, along with the exposed ends of the metallized areas, sites for the bonding of the solder blocks to the metallized surfaces of the respective films strips. The unmetallized margin areas 14 and 17, which are set back from the ends of the capacitor blanks by the offset winding, insures that the metallized surface of one film strip is not short circuited to the metallized surface on the other strip when a charging source is connected to the wire terminations.

In order to insure that there are sufficient unmetallized margin areas, the margin areas are initially made wide enough to compensate for any fuzzy demarcation lines 18 and 19 between the metallized and unmetallized surfaces of the film strips, and for the misregistration due to prior winding and rewinding operations. As a result of the use of relatively wide unmetallized margins and a significant amount of misregistration in the winding, there is a concomitant decrease in the areas of overlaying metallized surfaces available to act as capacitor plates. In order to provide a capacitor with a desired capacitance, it is necessary to provide relatively wide or long film strips to compensate for the required amount of misregistration of the wound film strips.

Turning now to a consideration of one embodiment of the present invention and referring to FIG. 3, there is shown a pair of metallized dielectric film strips or sheets 31 and 32 that are wound on a split mandrel 33 having half-round sections 33A and 33B to form a capacitor blank. The strips may be composed of dielectric plastic material characterized by an ability to transmit a laser beam. The rolled capacitor blank is further fabricated in accordance with the previously discussed manufacturing steps to produce either a cylindrical capacitor as shown in FIG. 7 or a flat capacitor as shown in FIG. 8.

In preparing the metallized film strips 31 and 32, dielectric film strips are passed through a vacuum metallizer or other metal coating device to form film strips having one surface completely metallized. Among the metals suitable for metallizing the films are zinc or aluminum. A single, wide film may have one of its surfaces completely metallized and then slit a number of times to form film strips 31 and 32 of a desired width. During the capacitor blank fabrication, these strips 31 and 32 are processed to form thin demetallized or non-conductive lines 34 and 35, which are utilized to define capacitor plate areas on the metallized surfaces.

More particularly, considering strip 31 and referring to FIGS. 3 and 6a, a demetallized line or linear area 34 is formed to run for a section 36 along the approximate centerline of the strip. This line then is diverged along a line 37 to a point at or near the marginal edge of the strip. From this point, a demetallized line 38 is formed to run along the margin or marginal edge. A margin of metal 39 (see FIGS. 4 and 6) may be formed to extend along the edge of the film strip. Demetallized line section 38 is extended to run into another diverging or reconverging line section 41 which runs to the approximate midsection of the film strip to connect with a line section 42 running along the approximate midsection. The midline section 42 is preferably longitudinally aligned with the midline section 36.

The strip 32 (see FIGS. 3 and 6b) is fabricated in a similar manner to form a demetallized line or linear area 35 having a demetallized line section 43 running along the approximate midsection of the film strip. The position of line sections 36 and 43 are selected so that when the film strips are wound on the mandrel 33, the lines 36 and 43 will be in a registered, overlaying relation. In the fabrication of the demetallized line 35, this line is diverted along line section 44 to the vicinity of the marginal edge of the film strip. It will be noted, however, that the diversion of line section 44 is in a direction opposed to the direction of the diverted line section 37 on film strip 31. The demetallized line 34 is extended along the margin or edge of the film strip to form margin line section 46, and a margin of metal 47 may be formed to extend along the edge of the film strip.

During the winding of the metallized films 31 and 32 on the mandrel 33 to form a capacitor blank, the bulk of windings have laterally spaced, demetallized lines running along opposed marginal edges. The demetallized line 35 is further diverted along reconverging line section 48 to a point at the approximate midsection of the film strip. Again, the line 34 is fabricated to extend along the approximate midsection of the film strip to form a line section 49. The positioning of line 49 is such that when the film strips 31 and 32 are wound together, the line sections 42 and 49 will be in overlaying relation. The line sections 42 and 49 need not be longitudinally aligned with the line sections 36 and 43, but it is important that the overlaying line sections 42 and 49 and line sections 36 and 43 be radially aligned or registered when the films are rolled into a capacitor blank.

The demetallized lines 34 and 35 may be formed by moving the metallized films relative to a pulsed laser beam which is diverted to form or scribe the discussed line configurations, and which is pulsed at a rate sufficient to produce a succession of over-laying demetallized spots that appear as continuous, finite demetallized lines on the metallized film strips. The film strip material is selected on the basis of dielectric properties and the ability to transmit or not absorb a significant portion of an impinged laser beam. Further, by emperical observations, the laser beams may be controlled and focused to foster removal of the metallized surface without damage to the underlying dielectric film. It is contemplated that other metal removing or scribing techniques may be used, such as machining the lines or vaporizing the lines by subjecting the moving metallized films to an output of an electron or arc discharge device.

The scribed centerline sections of the respective strips are made long enough to provide a number of core and peripheral wraps with the lines 36 and 43 in overlying relation, and with the lines 42 and 49 in overlying relation when a pair of scribed film strips are wound on the split arbor 33 to form a capacitor blank. The capacitor blank is further processed by again solder spraying the ends and wax impregnating the convolutions. As previously described with respect to the prior art technique, the capacitor blank may be provided with axially extending leads 27 and 28 as shown in FIG. 7 or the blank may be flattened and provided with radially extending leads 51 and 52, such as illustrated in FIG. 8.

In the construction shown in FIG. 8, the leads 51 and 52 are provided with offset shoulders 53 and 54 which may be engaged by blades of a machine inserter to insert the terminals into holes formed in a printed circuit board or substrate. The termination and packaging of such a machine insertable capacitor is further described in copending application Ser. No. 974,209, entitled PACKAGED MACHINE INSERTABLE ROLLED METALLIZED FILM CAPACITOR, filed on even date herewith in the name of J. R. Meal and assigned to the Western Electric Company, Incorporated.

An understanding of the electrical charge distribution that occurs when a capacitor composed of rolled film strips 31 and 32 scribed in accordance with the present invention, is connected in a charging circuit may be had by reference to FIGS. 4, 5 and 9. First, attention is directed to FIG. 5 and the right-hand portion of FIG. 9 depicted in zone C. FIG. 5 is an enlarged cross-sectional view taken along line 5—5 of FIG. 3 showing the film strips of a pair of outer convolutions in which the scribed lines 42 and 49 are in overlaying relationship. This figure also illustrates that the film strips are wound with a slight amount of misregistration to provide an exposure of metallized margin areas to facilitate the bonding of the solder blocks. When the capacitor is connected in a charging circuit, the right-hand edges of the metallized surfaces are subjected to the same potential, for example, a positive potential, while the left-hand metallized edges are subjected to negative potentials.

More specifically, the demetallized scribed line 42 divides the metallized surface of film strip 31 into two metallized sections 61 and 62, while the demetallized scribed line 49 divides the metallized surface of film strip 32 into sections 63 and 64. When the capacitor is connected into a charging circuit, a positive potential is impressed on overlaying sections 62 and 64 so that there is, in essence, no potential difference and, hence, there will be no significant charging of these sections to provide a capacitance effect. However, due to diagonal cross coupling of metallized areas 61 and 64 and areas 62 and 63, there is introduced an infinitesimal amount of capacitance which does not normally affect the rated capacitance value of the capacitor. In a like manner, the application of a negative potential to metallized overlaying sections 61 and 63 results in the application of the same potential to both sections and, thus, there is no significant charging of these sections to provide a capacitance effect.

With respect to the core windings of film strips, the metallized surfaces are again divided by overlaying scribed lines 36 and 43 (see FIGS. 3 and 6) to provide overlaying metallized sections that do not have different potentials applied thereto and, thus, these core windings will not be charged to exhibit a capacitance effect.

Inasmuch as the outer windings of the capacitor are subjected to equal potentials, these outer windings may be heat sealed by fusing the metallized convolutions without any danger of short circuiting the main capacitor plate areas. When a capacitor blank is wound on the mandrel 33 and the mandrel halves 33A and 33B are sequentially withdrawn to discharge the wound capacitor, there is a possibility that the sharp edges of the mandrel halves will cut into and short circuit the inner wrapped convolutions of metallized film. Inasmuch as these core convolutions are subjected to equal potential and are isolated from the main capacitor plates, the possibility of short circuiting the capacitor by mandrel withdrawal is eliminated.

Turning now to FIGS. 4 and zone A of FIG. 9, consideration will be given to the charging of the main capacitor plate areas defined by the scribed lines. As shown in FIG. 4, the scribed line 38 runs along the right-hand margin of the metallized film strip 31 to divide the metallized surface into a large plate area designated 66 and the narrow marginal metallized area 39. When the scribed line 38 runs along the edge, there will be no metallized margin area 39. The metallized surface of the film strip 32 is divided by the scribed line 46 to provide a metallized plate area 68 and a very narrow metallized margin area 47. Again, the scribed line 46 may run along the edge so that the margin area 47 is either interrupted or eliminated. The elimination of the margin areas 39 and 47 does not affect the charging of the main plate areas 66 and 68 of the capacitor because the opposed edges of respective film strips are demetallized.

The application of a positive potential to the right-hand edge portion plate area 68 and the application of negative potential to the left-hand edge portion plate area 66 results in an accumulation of positive and negative charges on these metallized areas to provide a capacitance effect. The application of positive potential to metallized margin area 39 is ineffective to alter the capacitance because the underlying and overlying metallized convolutions 68 are also subjected to a positive potential so that metallized margin area 39 does not assume a charge. In a like manner, the application of negative potential to the metallized margin area 47 is ineffective to alter the charge placed on the capacitor because the overlying and underlying metallized convolutions are also subjected to a negative potential and there is no charging of the metallized margin 47.

In the areas where the scribed lines 34 and 35 are diverted, such as along lines 41 and 48, illustrated in FIG. 9 and designated zone B, the triangular-shaped areas which are contiguous with plate areas 66 and 68 are oppositely charged to exhibit a capacitance effect. The right triangular overlaying areas defined by lines 41 and 48 that are contiguous with areas 61 and 63 and areas 62 and 64 are subjected to like potentials and are, in effect, equal in potential so as not to exhibit any significant capacitance effect.

Briefly summarizing, it will be noted from an inspection of FIGS. 4 and 5 that the film strips 31 and 32 are wound with a small mount of offset or mis-registration to provide left-hand and right-hand exposed metallized surfaces for attachment of the solder blocks 25 and 26. The amount of offset is minimized because no allowance has to be made for any fuzziness in the finite laser scribed lines 38 and 46 nor for prior winding and rewinding of the metallized film supply rolls. It should be appreciated that both the core and peripheral windings are divided by the overlaying scribed lines running along the approximate midsections of the respective strips into areas that are subject to equal electrical potentials and, hence, do not accumulate charges. The main capacitor plate areas on the intervening windings are defined by the diverging scribed lines 37 and 44, the margin scribed lines 38 and 46 and the converging scribed lines 41 and 48. The metallized surfaces in overlaying relation between these lines establishes the capacitance for the capacitor. It is these overlaying surfaces that are oppositely charged, when the capacitor is connected in a charging circuit.

With the practice of the method of the present invention, families of capacitors can be made with the same geometric size and shape but with different capacitance values. This can be readily accomplished by varying the position of the laser scribed margin lines, that is, by spacing the margin lines on the respective film strips closer together to reduce the areas of overlapping metallized surfaces that are subjected to different potentials. This can also be accomplished by moving the diverted lines 37 and 44 toward or away from lines 41 and 48 to increase or decrease the length of the capacitance forming areas on the respective strips. The capacitance can also be changed by increasing or decreasing the gauge of the dielectric material.

Attention is directed to FIG. 10 where a modified technique is utilized to scribe demetallized lines on a pair of films 71 and 72, each of which has, initially, one side completely metallized. In this instance, the metallized film 72 is scribed along one margin or edge with a continuous demetallized line 73. The other film strip 71 is scribed to provide a demetallized line that overlays the continuous margin line 73 on the core and peripheral windings of the capacitor blanks. The demetallized line on the metallized surface of strip 71 is diverted to run along the opposed margin to effectuate the formation of the capacitor plate areas on the intervening bulk of the capacitor blank windings.

More specifically, in FIG. 10, zone A represents a developed or unrolled showing of the main capacitor windings. In this construction, the principal capacitor plate windings have the continuous demetallized line 73 formed along the upper margin of the film 72, while a scribed margin line 74 runs along the lower margin of the metallized film strip 71. In zone B, the demetallized line is diverted and denoted by the reference numeral 76. This diverted line 76 runs from the termination of margin line 74 to a position overlaying the margin line 73, whereafter in zone C a demetallized line section 77 is scribed to overlay the continuous demetallized line 73. Zone C represents the peripheral windings of a capacitor blank, and it should be understood that the overlying demetallized line sections, similar to line 77 and 73, also exist on the core windings of the capacitor blank.

With this modified construction, the application of positive potential to one end of a terminated rolled capacitor and a negative potential to the other end, results in the application of equal potentials to the overlaying metallized convolutions forming the core and peripheral windings. The applied charging potential results in the impressions of charges of opposed polarity to the main capacitor windings illustrated by zone A. Again, in zone B, the diverted demetallized line 76 results in dividing the overlaying film strips into pairs of overlaying right triangular sections, one pair of which depicted by the reference numeral 78 will have charges of opposite polarity impressed thereon. The other pair of triangular overlying areas identified by reference numeral 79 are subject to the application of potentials of the same polarity and, hence, will not assume a charged condition.

In FIG. 10, the margin line 74 is shown as being diverted along line section 76, and it was stated that there was a similar diversion at the end of the core windings where a demetallized line overlying continuous line 73 is diverted to run into margin line 74. It should also be understood that the line 73 may be positioned in underlying relationship with the line 74, and then diverted to the opposed margin at the end of the core winding. In other words, it is only necessary that the margin lines are in overlying relation on the core and peripheral windings to attain the non-charge condition of the peripheral and core windings and the isolation of these windings from the main body of capacitor windings which have demetallized lines running along respective opposed margins or edges.

A still further construction is depicted in FIG. 11 where one of a pair of metallized film strips 81 is provided with a metal-free margin 82 during the initial fabrication of the metallized strip. For example, the demetallized area may be formed by selectively vapor depositing the metal through a margin-forming mask. In this construction another completely metallized film strip 83 is formed with a laser scribed, demetallized margin line 84 in zone A, a diverted demetallized line section 86 in zone B, and an overlying scribed demetallized line 87 in zone C which represents the peripheral windings of a capacitor blank. The margin line 87 overlies the unmetallized margin area 82 and, thus, the application of charging potential to the peripheral windings is ineffective to impress opposed charges to the overlying metallized peripheral windings. The transition windings between the core and the main capacitor plate windings is provided with a diverted line similar to diverted line 86 which runs from a position overlying the metal-free margin 82 to the scribed demetallized line 84. Again, the overlying metallized surfaces of the core windings have impressed thereon potentials of like polarity and, hence, will not assume a charged condition. Charges of opposite polarity are applied to the metallized areas of the adjacent, intervening windings, between the core and peripheral windings, so that the bulk of the windings of the capacitor will be charged and, hence, function as capacitor plates.

Figure 13:
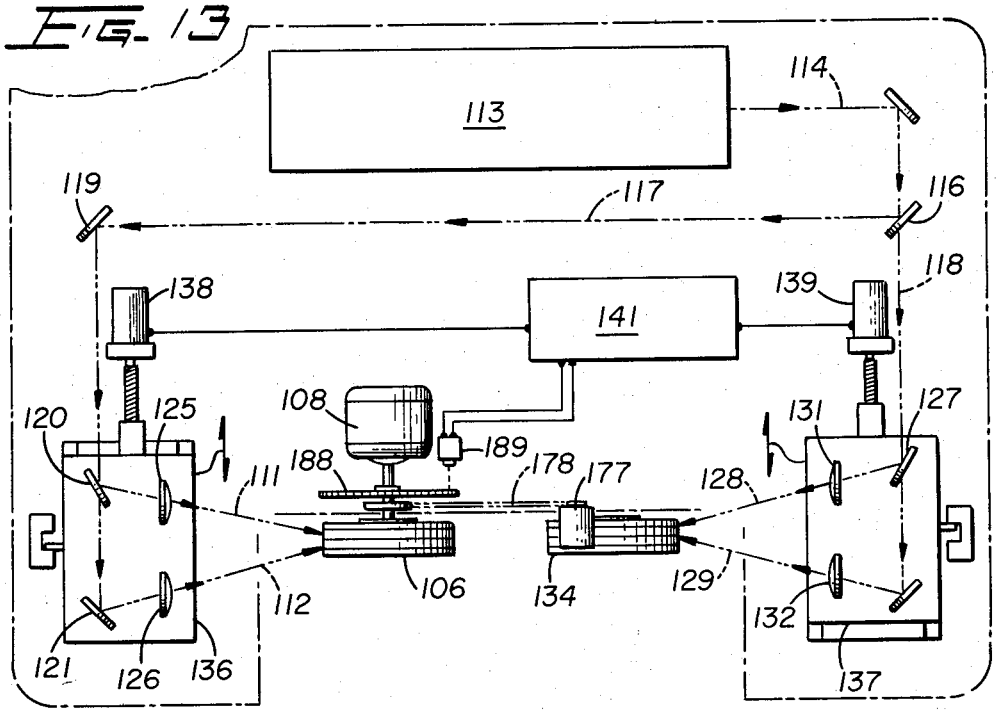
FIG. 13 is a plan view of laser scribing facilities that are used in the system shown in FIG. 12 to scribe overlaying and margin lines on the metallized film strips.

In order to illustrate the practice of the method of the present invention to produce a capacitor blank in accordance therewith, there is shown in FIGS. 12 and 13 a machine for laser scribing and winding two pair of scribed metallized film strips to simultaneously make two capacitor blanks. The details of construction of this machine are more fully described in copending application entitled MACHINE FOR LASER SCRIBING AND WINDING METALLLIZED FILM CAPACITOR BLANKS, Ser. No. 974,153, filed even date herewith in the name of W. J. Fanning and assigned to the Western Electric Company, Incorporated.

In use of this machine, a supply roll 101 of dielectric plastic film, e.g., Mylar polyester, is placed on a rotatable arbor 102. The film is completely metallized on one surface thereof. Film 101 is withdrawn from the roll and passes a film tension sensing device 103 for controlling a band brake 104 to regulate the payoff of film from the roll. Next the film is advanced to tangentially engage and ride on the peripheral surface of a highly polished stainless steel drum 106 which is driven by a friction surfaced roller 107 which is rotated by a motor 108 (see FIG. 13). The film is held against the drum by a spring-biased pinch roller 109 so that the film is advanced by rotation of the drum. As the film strip passes over the drum, a pair of pulsed laser beams 111 and 112 are impinged on the metallized surface to laser scribe a pair of spaced demetallized lines, each of which may be in a pattern in conformance with the embodiment of the invention described with respect to FIGS. 3, 4, 5, 6 and 9, or in accordance with the embodiments shown in the other figures.

As illustrated in FIG. 13, a single Nd:YAG laser beam generator 113 produces a pulsed laser beam 114 which is split by a half mirror 116 into laser beams 117 and 118. Laser beam 117 is reflected by a mirror 119 onto another half mirror 120 where the beam is split into reflected beam 111 and a transmitted beam which is reflected off of a mirror 121 as beam 112 which are directed through focusing lenses 125 and 126 onto the advancing metallized surface of the film 101. The laser beams are focused to impinge on the metallized surface to evaporate lines of surface metal without damage to the underlying plastic film strip.

There are many parameters that may be controlled to insure that the laser beam does not damage the underlying plastic dielectric strip. Among the controls that may be effected are the pulse rate, the size of the impinging laser beam, the focus of the lenses to impart varying degrees of de-focusing, the wave length of the beam and the energy level imparted to the laser's Krypton lamps. It should be noted that the splitting of the beam results in a reduction of the energy level of the originating beam by at least a factor of four at impingement sites on the metallized film.

It has been found that satisfactory results can be attained in demetallizing a Zn or Al metallized Mylar polyester film with a laser beam operating in a TEMoo Mode at a pulse rate of 3000 Hz with a 150 nanoseconds pulse width so that the beam is on for 0.045% of the time. The metallized film was advanced at a rate of five inches per second.

In a similar manner, the beam 118 is further split by a half mirror 127 into a beam 128 and a reflected beam 129 which are focused by lenses 131 and 132 onto the metallized surface of a second metallized film 133 which is being advanced over a second highly polished rotating drum 134. The pairs of mirrors for directing the beams 111 and 112 and the beams 128 and 129 are mounted on a pair of reciprocal slides 136 and 137 respectively driven by reversing motors 138 and 139 that are program controlled by a controller 141. The controller 141 may be any of a number of commercially available programmed controllers, such as Texas Instruments Model 5TI-1023 Sequencer.

Figure 14:
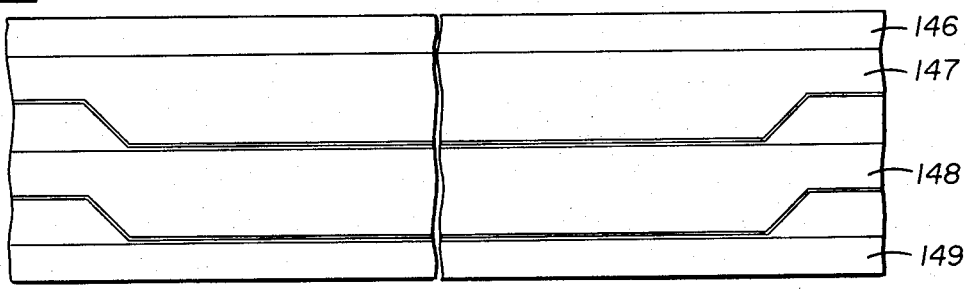
FIG. 14 is a plan view of one completely metallized film surface that is laser scribed by the system shown in FIGS. 12 and 13 to produce a pair of scribed film strips.
Figure 15:
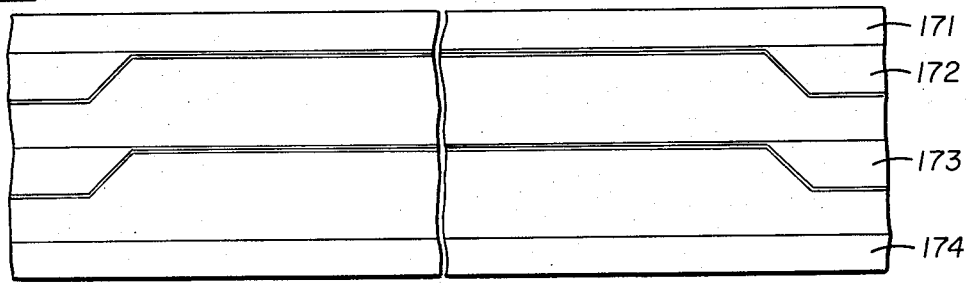
FIG. 15 is a plan view of one completely metallized film surface that is laser scribed by the system shown in FIGS. 12 and 13 to form a pair of scribed film strips which are wound with the pair of film strips shown in FIG. 14 to produce, in accordance with the present invention, a capacitor blank of the type illustrated in FIG. 9.

The impingement of the laser beams on the metallized surfaces, demetallizes or scribes lines in accordance with the pattern shown in FIGS. 14 and 15 which are identical to the pattern shown in FIGS. 3, 6 and 9. The lased film is now slit by a series of three echeloned knives 142, 143 and 144 to form four film strips 146, 147, 148 and 149 with the demetallized line patterns on the film strips 147 and 148. The film strips 146 and 149 are not laser scribed and are considered scrap. With the arrangement of the laser scribing and severing facilities in close proximity to each other, film strips 147 and 148 are formed with the lased patterns precisely positioned on the strips. Any effect of weaving of the film passing over the drum 106 is dissipated by the manufacture of the strips 146–149 on the surface of the drum.

The film strips are advanced past a separation roller 151 (FIG. 12) where the scrap strips 146 and 149 are guided by a subsequent roller 152 to a vacuum tube-like takeup 153. The scribed strips 147 and 148 are now advanced into a tension sensing and accumulator device generally designated by the box 154, the details of which are completely described in the afore-identified W. J. Fanning copending application. The film strips 147 and 148 emanating from the device 154 pass over a slotted lateral positioning shoe 156 to a split mandrel 157 similar to mandrel 33 shown in FIG. 3. The mandrel 157 and supporting and actuating structure forms part of a modified commercial winding facility such as manufactured by E. W. Barton Company, San Fernando, Calif., and sold as Parts No. 2909-01 and 2909-506.

A roll of metallized film 133 is rotatably mounted on an arbor 161. The film 133 is withdrawn and passes over a tension sensing roller 162 which controls an arbor braking band 163. This film tangentially engages the second highly polished stainless steel drum 134 whereafter the laser beams 128 and 129 laser scribe demetallized lines in a pattern such as shown in FIG. 15. Again, a series of three echeloned knives 166, 167 and 168 slit the film to form film strips 171, 172, 173 and 174. In this instance, the strips 171 and 174 are scrap strips, and the strips 172 and 173 are formed with the precisely positioned laser scribed demetallized patterns.

A spring-biased pinch roller 176 holds the strips against the periphery of the drum 134. The drum 134 is driven by a friction surface roller 177 which is rotated by belting 178 which, in turn, is driven by the motor 108. The drive roller 177 is mounted on an eccentric 179 so that the axis of the roller 177 can be moved toward and away from the axis of rotation of the drum 134. By varying this distance, the relative speeds of the films emanating from the drums 106 and 134 may be varied; that is, the film strips 171 to 174 can be fed at a slower rate.

The film strips leaving the drum 134 passes over a separation roller 181 whereafter the scrap strips 171 and 174 are directed into the vacuum tube-like takeup 153. The laser scribed strips 172 and 173 pass into the tension sensing and accumulator device 154 and from there exit onto a slotted lateral positioning shoe 182. From shoe 182 the film strips 172 and 173 pass to the winding mandrel 157 where these strips are simultaneously wound with the strips 147 and 148 to form a pair of capacitor blanks.

Inasmuch as the film strips 172 and 173 are being wound within the convolutions of the film strips 147 and 148, the diameters of the successively wound convolutions of film strips 172 and 173 are smaller than the overlying convolutions of film strips 147 and 148. By adjusting the eccentrically mounted drive roller 177 to feed the film strips 172 and 173 at a slower rate to compensate for the differences in diameters of the overlaying convolutions of wound strip, all of the strips are wound by the mandrel 157 with uniform tension.

It will be appreciated that the drums 106 and 134 positively force feed the film strips toward the winding mandrel 157 so that the winding mandrel can wind the strips with a minimum amount of pulling tension being imparted to the strips. With this construction, very thin strips of materials can be wound. Mandrel 157 is driven by a motor provided with the commercially purchased unit, and is mounted in a turret 186 which also provides a mounting for a second split mandrel 187 which is driven simultaneously with the mandrel 157.

The lengths of lased film strips fed to and wound on the mandrel 157 is monitored by means of a multi-slotted disc 188, see FIG. 13, and a photodetector 189 which provides a signal to the controller 141 when sufficient lengths of strip material are fed to the winding mandrel 157 to form a pair of capacitor blanks with the afore-discussed lased patterns. When the controller 141 is apprised that a pair of capacitor blanks are wound on the mandrel 157, control signals are generated to effectuate a rotation of the turret 186 to orbit the mandrel 157 from a winding position 191 to a discharge position 192. The trailing extremities of the wound strips are moved over a slotted post 193 while mandrel 157 is orbiting into the discharge position 191. The rotation of the turret simultaneously orbits the split mandrel 187 from the discharge position 192 to the winding position. At the time of the start of the turret movement, one of the halves of mandrel 187 is withdrawn into the turret while the otherhalf is moved to engage the film with the diametric surface of the extended mandrel half aligned with the film strips. At the winding position, the other half of the mandrel 187 is pushed forward to captivate the film strips between the mandrel halves. The control of the turret and the operation of the mandrels are further described in the afore-identified W. J. Fanning patent application.

Upon completion of the orbiting of the turret, the controller initiates operation of an air cylinder 196 to thrust a serrated knife 197 through the strips spanning the slotted post 193. At this time signals are also generated by the controller to operate air cylinders 198 and 199 to sequentially move two sets of holding wires 200 and two heating devices 201 into engagement with the pair of wound capacitor blanks on the mandrel 157. Subsequent slow rotation of the mandrel 157 wraps up the trailing extremities of the film strips which bear the overlying lased lines. The heater 201 is rendered effective to bond the outer convolutions of the film strips to prevent unraveling when the mandrel is subsequently withdrawn to discharge the pair of wound capacitor blanks down to discharge chute 202. While the mandrel 157 is slowly rotating in the discharge position, the mandrel 187 now in the winding position 191 is also rotating to commence the winding of a subsequent pair of capacitor blanks.

In summary, the machine shown in FIGS. 12 and 13 is effective to wind a pair of films 147 and 148 with a pair of films 173 and 174 to produce a pair of capacitor blanks each having core windings with overlaying scribed lines, capacitor plate windings with laser scribed lines running along opposed margins and peripheral windings with laser scribed lines again running in overlaying relationship. When such a capacitor is terminated and connected into a charging circuit, the core and peripheral windings will not be charged, while the metallized surfaces of the intervening plate windings are charged. The positioning shoes 156 and 182 are located so as to guide the film strips 147 and 148 with respect to the film strips 172 and 173 to provide a slight degree of edge misregistration as the film strips are simultaneously wound on either of the mandrels 157 or 187. This winding is such that the completely metallized margins of the respective pairs of strips overlie the laser scribed margins of the other strips so as to provide interstices between every other convolution on each end of each capacitor blank to permit the entry of subsequently applied solder spray which forms a good bond with the exposed metallized margins to form the solder blocks, such as blocks 25 and 26 shown in FIG. 7, for attachment of the wire-like leads 27 and 28 or other terminations.

With the described method, complete families of capacitors can be produced with different capacitance values, but with the same geometric sizes. This can be accomplished by changing the strokes imparted to reciprocate the slides 136 and 137 so that the margin scribed lines formed on strips 147 and 148 and on strips 172 and 173 are brought closer together to reduce the overlaying areas of the film strips that are oppositely charged. Further, the capacitance values can also be changed by moving the diverted scribed lines closer together along the lengths of the strips, so that the lengths of the charged overlaying metallized surfaces are reduced. In either case, the resultant capacitor blanks will be the same size to permit subsequent packaging in containers or boxes of the same size, such as the boxes disclosed in the afore-identified application to J. R. Meal.

What is claimed is:

1. A rolled film capacitor blank, which comprises:
a pair of convoluted films, each having a metal coated surface engaging a non-metal coated surface of the other film;
each of said films having a non-coated continuous linear area formed in and running along the length of each of the respective metallized surfaces wherein the continuous non-coated areas on each of the respective films are in overlaying positions on the core and peripheral convolutions and the continuous non-coated areas on each of the respective films extend to and run along opposed margins of the respective films for the remainder of the convolutions.

2. A capacitor blank, which comprises:
a pair of wound films, each having a metallized surface engaging a non-metallized surface on the other film;
said metallized surfaces having non-metallized lines running longitudinally along opposed margins of the respective films; and
each of said non-metallized lines extending into overlaying relationships on the core and peripheral convolutions of the wound films.

3. A rolled film capacitor blank for use in forming a capacitor, which comprises:
a pair of convoluted dielectric films, each having a conductive coating on one surface thereof which engages a non-conductive surface of the other film;
each film having a non-conductive line running longitudinally along one margin of the coated surface, said non-conductive lines being formed in the opposed margins of the respective films; and
at least one of said non-conductive lines extending into overlaying relationship with the other non-conductive lines on both the core and peripheral convolutions of said films.

4. A capacitor blank having two dielectric strips wound together in a roll wherein:
each of said strips has one side metallized which abuts the unmetallized side of the other strip; and
each of said strips has an unmetallized line running along the length of each metallized side, the lines on the respective strips being in overlaying relationship on the core and the peripheral convolutions and the lines being laterally spaced from each other along the intervening convolutions.

5. A capacitor blank, as defined in claim 4, wherein:
the unmetallized lines at the core and peripheral convolutions are diverted in opposed directions to run into the laterally spaced lines.

6. A capacitor blank, as defined in claim 4, wherein:
one of the overlaying unmetallized lines on the core convolutions is diverted to run into an end of one of said laterally spaced lines, and one of the overlaying unmetallized lines on the peripheral convolutions is diverted to run into the other end of said one of the laterally spaced lines.

7. A capacitor blank, which comprises:
a pair of convoluted dielectric films, each having a metallized coating on one surface thereof, said films being convoluted into a roll to present the coated surface of each film to the non-coated surface of the other film;
each of said films having a non-coated line along one margin thereof and the non-coated line of one film being in an opposed margin to the non-coated line on the other film; and
said non-coated lines extending along said opposed margins for nearly the entire lengths of said films and converging into overlaying relation on the convolutions at the core and the periphery of the roll.

8. A capacitor blank, which comprises:
a pair of dielectric film, each having one surface completely metallized, said films being convoluted together with the metallized surface of each film abutting the non-metallized surface of the other film;
each of said films having a non-metallized line running along the core and peripheral windings of the convoluted films, which lines overlay each other, and non-metallized diverted lines running from said overlaying relations to positions in opposed marginal areas of the respective metallized surfaces, said films also having non-metallized lines running between said diverted non-metallized lines and along said marginal areas to isolate opposed marginal metallized surfaces from the metallized surfaces on the convolutions between the core and peripheral windings.

9. A capacitor blank, which comprises:
a first dielectric film strip with a conductive coating on one surface thereof;
said first film strip having a first non-conductive line running from one end of said first strip along the approximate midsection, diverging toward one margin, running along said margin, diverging toward the approximate midsection, and then along said approximate midsection to the other end of said first strip;
a second dielectric film strip with a conductive coating on one surface thereof;
said second film strip having a second non-conductive line running from one end of said second strip along the approximate midsection, diverging toward a margin which is opposite to the margin along which said first line runs, diverging toward the approximate midsection, and then along said approximate midsection to the other end of said second strip; and
said first and second strips being convoluted together with the coated surface of each strip engaging the non-coated surface of the other strip, and the non-conductive lines being in overlaying relationship on the inner and outer convolutions of said strips while the non-conductive lines run along opposed margins of the intervening convolutions of said strips.

10. A capacitor blank, as defined in claim 9, wherein the convolutions of strips are offset from one another to expose coated margins in the interstices formed between adjacent convolutions of the same strip.

11. A capacitor, which comprises:
a pair of films of dielectric material in overlaying relationship, each having a metallized surface with the metallized surface of at least one sheet abutting the non-metallized surface of the other sheet;
each of said metallized films having an unmetallized line running along one side margin, said unmetallized lines on the respective sheets being in opposed side margins and each unmetallized line running into overlaying relationship at the opposite end sections of the sheets; and
termination means engaging opposed side margins of both sheets for applying potentials of opposite polarity to overlaying metallized areas defined by the unmetallized margin lines and the unmetallized lines running into overlaying relationship, and for applying potentials of like polarity to the overlaying metallized areas at said end sections defined by the opposed end edges of the respective metallized sheets and the overlaying unmetallized lines running to the opposed umetallized margin lines.

12. A rolled film capacitor, which comprises: a pair of dielectric films convoluted together, each film having a metallized coating on one surface thereof which engages the non-metallized surface of the other film;
each of said metallized films having a non-metallized area running longitudinally along opposite margins of the respective films, at least one of said longitudinal areas running into overlaying relationship with the other longitudinal areas at both the core and peripheral convolutions of said films; and
electrical terminations engaging the completely metallized opposed margins of both films for applying electrical potentials to said films to charge the metallized coatings with charges of opposite polarity on the metal coated areas between the convolutions having non-metallized areas in the opposed margins of the respective films and for applying potentials of like polarity to the metal coated areas having non-metallized areas in overlaying relationship.

13. A rolled film capacitor comprising:
first and second convoluted films, each having a metal coating covering the entire surface area on one side, the coated surface of each film abutting the non-coated surface of the other film;
said first film having an uncoated line running along a first margin;
said second film having an uncoated line running along a second margin which is opposite to said first margin;
said margin lines converging in overlaying relationships in the vicinities of both the core and periphery of said convoluted films; and
electrical terminations connected to opposite edges of the coatings on convoluted films to provide a capacitor having a capacitance determined by the overlaying coated areas between the margin lines and the converging margin lines.

14. A method of fabricating a capacitor blank, which comprises:
simultaneously winding two film strips, each with a metal coated surface, on a common mandrel with metal coated surface of each strip engaging the non-coated surface of the other strip; and
forming a pair of metal-free continuous linear areas to individually extend along the metal coated surfaces with the linear areas extending in overlaying relationship on the inner and outer convolutions of wound film strip, and extending to and along opposed marginal edges of the respective film strips on the intervening convolutions.

15. A method of fabricating a capacitor blank, as set forth in claim 14, wherein the forming step includes:
scribing the metallized surface to remove lines of metal to form the linear areas.

16. A method of fabricating a capacitor blank, as set forth in claim 15, wherein the forming step includes:
scribing the lines to run along the approximate midsections of the inner and outer convolutions.

17. A method of fabricating a capacitor blank, as set forth in claim 15, wherein the forming step includes:
scribing one line to run continuously along one margin edge of a first strip, and
scribing the other line on the second strip to run along a first margin in overlaying relationship to said one line of the first strip on the inner and outer convolutions, and to run from said overlaying relationships to and along the opposed margins of said second strip on the intervening convolutions.

18. A method of fabricating a capacitor blank, as set forth in claim 14, wherein said forming step includes:
masking one of said strips along a marginal edge;
depositing metal on the remainder of said one strip to form the strip with a metal coating having linear areas free of metal running along one marginal edge; and
scribing the other metal coated film to remove the metal along a line that overlays the metal-free marginal edges on the inner and outer convolutions, and runs to and along the other marginal edges on the intervening convolutions.

19. A method of fabricating a capacitor blank, as defined in claim 14, wherein said forming step includes:
impinging a pair of laser beams on said metal coated surfaces to scribe said metal-free linear areas on the respective metal coated surfaces of said film strips.

20. A method of fabricating a capacitor blank, which comprises:
advancing and winding a pair of dielectric strips each having one surface coated with a metal and wound to abut the metal coated surface of each strip against the non-coated surface of the other strip;
removing a continuous line of metal coating from each advancing strip, said line of metal being initially removed along the approximate centerline of each strip, then along opposed margins of the respective strips, and finally along the approximate centerline of each strip; and
guiding said strips to wind the strips with the continuous line of the respective strips being in overlaying relation on the initial and final windings and along the opposed margins of the intervening windings.

21. A method of fabricating a capacitor blank, as defined in claim 20, which comprises:

guiding the strips to overlay each other with the metal coated margins extending beyond the margins with the continuous lines of removed metal.

22. A method of fabricating a capacitor blank, which comprises:
   scribing metallized surfaces on a pair of elongated dielectric films to form a pair of continuous demetallized lines which individually run along the length of each film;
   controlling the scribing action to form the individual lines to run along the approximate midsection of each film at both end sections of the films and along the opposed margins of the intervening sections of the films; and
   overlaying said films with a thickness of the dielectric film interposed between the metallized surfaces and with the demetallized lines running along the approximate midsections being in register with each other while the intervening sections of the lines run along opposed margins of the respective films.

23. A method of fabricating a capacitor blank, which comprises:
   advancing and winding a pair of metallized film strips on a common mandrel, each of said film strips having only one surface metallized and the winding of the film strips moves the metallized surface on each film strip into engagement with the non-metallized surface on the other film strip;
   scribing a continuous demetallized line on the metallized surface of each advancing film strip, and positioning the scribing action to form demetallized lines that are in registration with each other on the inner convolutions of wound strips;
   shifting the scribing action to form demetallized lines that run along opposed margins of the respective film strips on subsequent convolutions of wound strips; and
   again shifting the scribing action to form demetallized lines that are in registration with each other on the final convolutions of wound strips.

24. A method of manufacturing a rolled metallized film capacitor blank, which comprises:
   advancing a pair of film strips along spaced apart paths, each of said film strips having one surface thereof completely metallized;
   scribing a continuous demetallized line on each advancing film strip;
   winding said film strips on a common mandrel with the metallized surface of each film strip engaging the non-metallized surface of the other film strip;
   initially controlling said scribing to form demetallized lines of the respective strips that are in overlaying relation when the initial convolutions of the film strips are wound on the mandrel;
   controlling said scribing to divert the scribed lines in diverse directions to run along opposed margins of the respective films when the film strips are wound on the mandrel; and
   finally controlling said scribing to again divert the scribed lines in diverse directions to again form demetallized lines on the respective strips that are in overlaying relation when the final convolutions of the film strips are wound on the mandrel.

25. A method of fabricating a rolled film capacitor, which comprises:
   simultaneously winding two films, each with a metallized surface, on a common mandrel with the metallized surface of each film wound to engage the non-metallized surface of the other film;
   scribing a pair of demetallized lines in the metallized surfaces that are in overlaying relation on the inner and outer windings of the film, and individually run along first opposed marginal edges on the intervening windings; and
   securing terminals to second opposed metallized marginal edges of the intervening windings.

26. A method of fabricating a capacitor, which comprises:
   scribing a metallized surface of a first dielectric film to form a first continuous demetallized line;
   scribing a metallized surface on a second dielectric film to form a second continuous line;
   winding the scribed films together to abut the metallized surface of each film against the unmetallized surface of the other film;
   controlling the positions of said scribing actions to position said scribed lines in overlaying relation on the core and peripheral windings of said films and along opposed margins on the intervening windings; and
   securing terminals to the opposed metallized margins.

27. A method of fabricating a capacitor, as set forth in claim 26, wherein the winding step includes:
   winding the films with a degree of misregistration to extend the completely metallized margins beyond the margins having the scribed lines.

28. A method of fabricating a capacitor, as defined in claim 27, wherein the securing step includes:
   securing the terminal to the completely metallized margins exposed between adjacent convolutions of the wound films.

* * * * *